(12) United States Patent
Beaucoup et al.

(10) Patent No.: US 8,582,754 B2
(45) Date of Patent: Nov. 12, 2013

(54) METHOD AND SYSTEM FOR ECHO CANCELLATION IN PRESENCE OF STREAMED AUDIO

(75) Inventors: Franck Beaucoup, Vancouver (CA); Wilfrid LeBlanc, Vancouver (CA); Aleksander Radisavljevic, Victoria (CA)

(73) Assignee: Broadcom Corporation, Irvine, CA (US)

( * ) Notice: Subject to any disclaimer, the term of this patent is extended or adjusted under 35 U.S.C. 154(b) by 63 days.

(21) Appl. No.: 13/052,608

(22) Filed: Mar. 21, 2011

(65) Prior Publication Data

US 2012/0243676 A1   Sep. 27, 2012

(51) Int. Cl.
*H04M 9/08* (2006.01)

(52) U.S. Cl.
USPC .................................................. 379/406.05

(58) Field of Classification Search
USPC .................................................. 379/406.05
See application file for complete search history.

(56) References Cited

U.S. PATENT DOCUMENTS

2006/0168114 A1* 7/2006 Glatron et al. ............... 709/218
2008/0031467 A1* 2/2008 Haulick et al. ................ 381/66

\* cited by examiner

*Primary Examiner* — Alexander Jamal
(74) *Attorney, Agent, or Firm* — Thomas | Horstemeyer, LLP

(57) ABSTRACT

During playing of a streamed audio while engaging in a voice communication session, a communication device may be operable to generate a background audio during an echo cancellation operation for the voice communication session, using known information associated with the streamed audio. The streamed audio may comprise audio content that is received from one or more external sources and/or locally generated within the communication device. The known information associated with the streamed audio may comprise an echo replica corresponding to an echo associated with the streamed audio and/or a modified version of the streamed audio. In instances when a residual echo suppression is operational during the echo cancellation operation, the communication device may be operable to suppress a residual echo based on a signal level of the echo replica corresponding to the echo associated with the streamed audio and/or a signal level of the modified version of the streamed audio.

19 Claims, 5 Drawing Sheets

METHOD AND SYSTEM FOR ECHO CANCELLATION IN PRESENCE OF STREAMED AUDIO

CROSS-REFERENCE TO RELATED APPLICATIONS/INCORPORATION BY REFERENCE

[Not applicable]

FIELD OF THE INVENTION

Certain embodiments of the invention relate to signal processing. More specifically, certain embodiments of the invention relate to a method and system for echo cancellation in presence of streamed audio.

BACKGROUND OF THE INVENTION

Echo cancellation is a process of removing echo from a voice communication in order to improve voice quality on a voice communication such as a conventional telephone call or a mobile phone call. Sources of echo may comprise, for example, acoustic echo and/or hybrid echo. Acoustic echo arises when audio or sound from a speaker is picked up by a microphone. The speaker may be, for example, an earpiece of a telephone handset and the microphone may be a microphone in the very same handset. The acoustic echo may exist in any communications scenario where there is a speaker and a microphone, especially during a hands-free operation. Hybrid echo may be generated by the public switched telephone network (PSTN) through a reflection of electrical energy by a device called a hybrid. Most telephone local loops are two-wire circuits while transmission facilities are four-wire-circuits.

The echo cancellation process may sometimes result in what is referred to as residual echo. The residual echo is an echo that is not cancelled by the echo cancellation process. This may occur as a result of a deficient length of an adaptive filter, a mismatch between a true and an estimated echo path, and/or nonlinear signal components, for example. To eliminate the residual echo, a residual echo suppression process may be used. The residual echo suppression process may employ a non-linear processor (NLP) function, for example.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for echo cancellation in presence of streamed audio, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
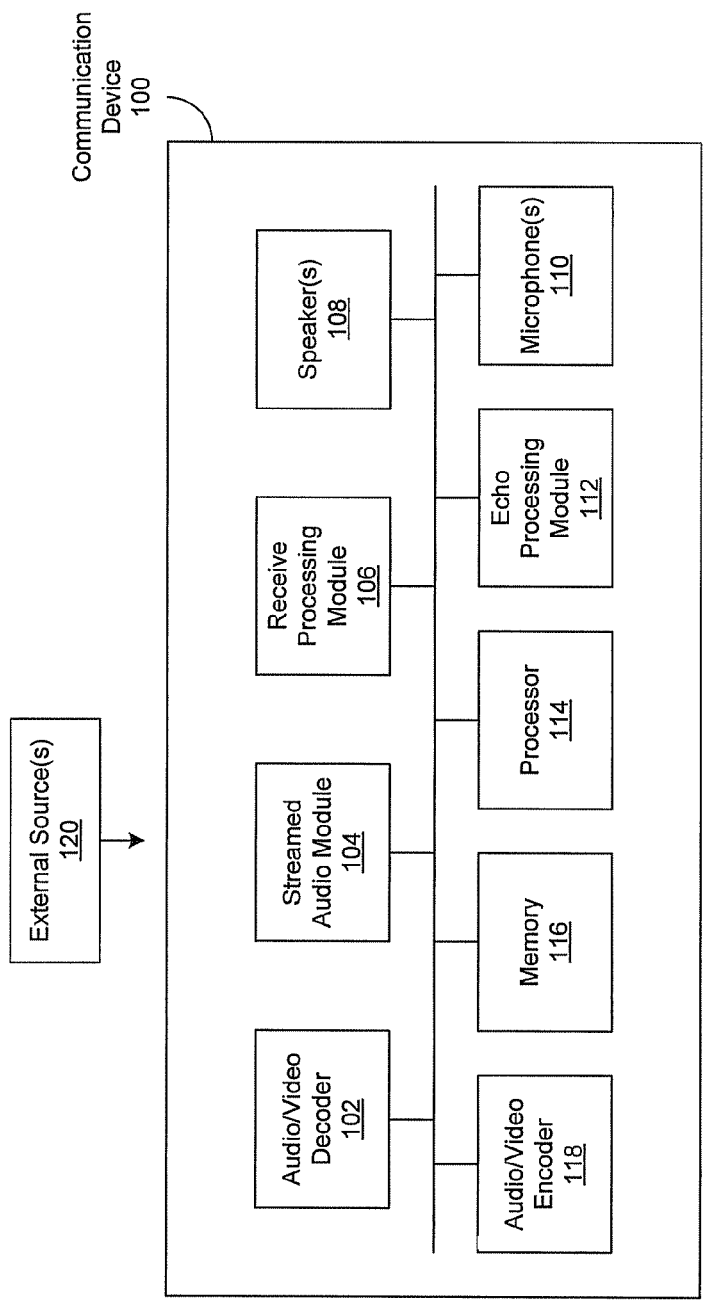
FIG. 1 is a block diagram illustrating an exemplary communication device that is operable to provide echo cancellation in presence of streamed audio, in accordance with an embodiment of the invention.

Certain embodiments of the invention can be found in a method and system for echo cancellation in presence of streamed audio. In various embodiments of the invention, a communication device, which may comprise one or more speakers and one or more microphones, may be operable to play a streamed audio via the one or more speakers while the communication device is engaged in a voice communication session via the one or more microphones and the one or more speakers. During an echo cancellation operation for the voice communication session, a background audio may be generated by the communication device in a send path that is used for communicating the voice communication session using known information associated with the streamed audio. In this regard, the streamed audio may comprise audio content that is received from one or more external sources and/or locally generated within the communication device.

In an exemplary embodiment of the invention, the communication device may be operable to generate an echo replica corresponding to an echo associated with the streamed audio and an echo replica corresponding to an echo associated with a far-end voice using one or more filters during the echo cancellation operation. The echo associated with the far-end voice may be eliminated by the communication device using the generated echo replica corresponding to the echo associated with the far-end voice during the echo cancellation operation. In instances when a residual echo suppression is operational or active during the echo cancellation operation, the communication device may be operable to suppress a resulting residual echo associated with the far-end voice based on a signal level of the echo replica corresponding to the echo associated with the streamed audio. In this regard, the background audio may be generated by the communication device in the send path using the echo replica corresponding to the echo associated with the streamed audio.

In an exemplary embodiment of the invention, the communication device may be operable to generate an echo replica corresponding to a mixed echo associated with the streamed audio and a far-end voice using one or more filters during the echo cancellation operation. The communication device may be operable to eliminate the mixed echo associated with the far-end voice and the streamed audio using the generated echo replica corresponding to the mixed echo during the echo cancellation operation. A modified version of the streamed audio may be generated by the communication device. In instances when a residual echo suppression is operational or active during the echo cancellation operation, the communication device may be operable to suppress a resulting residual echo associated with, for example, the far-end voice based on the modified version of the streamed audio. In this regard, the background audio may be generated by the communication device in the send path using the modified version of the streamed audio, regardless of an operation of the residual echo suppression.

FIG. 1 is a block diagram illustrating an exemplary communication device that is operable to provide echo cancellation in presence of streamed audio, in accordance with an embodiment of the invention. Referring to FIG. 1, there is shown a communication device 100 and one or more external sources 120. The communication device 100 may comprise an audio/video decoder 102, an audio/video encoder 118, a streamed audio module 104, a receive processing module 106, an echo processing module 112, one or more speakers 108, one or more microphones 110, a processor 114 and a memory 116.

The audio/video decoder 102 may comprise suitable logic, circuitry, interfaces and/or code that may be operable to perform video decoding and/or audio decoding functions. The audio/video decoder 102 may generate signals to the receive processing module 106 for further processing. For example, the audio/video decoder 102 may decode or decompress received far-end voice or speech. The audio/video decoder 102 may decode audio received from one or more external sources 120 such as, for example, Internet radio.

The audio/video encoder 118 may comprise suitable logic, circuitry, interfaces and/or code that may be operable to perform video encoding and/or audio encoding functions. For example, the audio/video encoder 118 may encode or compress signals on a send path to generate output signals for transmission.

The streamed audio module 104 may comprise suitable logic, circuitry, interfaces and/or code that may be operable to play streamed audio via one or more speakers 108. The streamed audio may comprise, for example, music, TV audio and/or gaming sounds. The streamed audio module 104 may receive audio content from one or more external sources 120. The streamed audio module 104 may store audio content such as music content for play via, for example, video/audio playback operations and/or MP3 playback operations.

The receive processing module 106 may comprise suitable logic, circuitry, interfaces and/or code that may be operable to receive far-end voice or speech signals and/or streamed audio content. The receive processing module 106 may process the received voice signals and/or audio content and may generate signals for the speaker(s) 108.

The echo processing module 112 may comprise suitable logic, circuitry, interfaces and/or code that may be operable to perform echo cancellation and/or suppression functions for the communication device 100. The echo processing module 112 may receive near-end voice or speech signals as well as echoes via the microphone(s) 110. The echoes may comprise, for example, echoes associated with the far-end voice and/or the streamed audio.

In an exemplary embodiment of the invention, the streamed audio module 104 may be operable to play a streamed audio via the one or more speakers 108 while a voice communication session is also active via the one or more microphones 110 and the one or more speakers 108. In such instances, a background audio may be generated by the echo processing module 112 in a send path during an echo cancellation operation using known information associated with the streamed audio. The send path is a path that is used for communicating the voice communication session.

The processor 114 may comprise suitable logic, circuitry, interfaces and/or code that may be operable to coordinate operation of various components of the communication device 100. The processor 114 may, for example, run an operating system of the communication device 100 and control communication of information and signals between components of the communication device 100. The processor 114 may execute code stored in the memory 116.

The memory 116 may comprise suitable logic, circuitry, interfaces and/or code that may be operable to store information such as executable instructions, data and/or database that may be utilized by the processor 114. The memory 116 may comprise, for example, DRAM, SRAM, flash memory, a hard drive or other magnetic storage, and/or any other suitable electronic data storage.

In exemplary operation, the streamed audio module 104 may be operable to play a streamed audio via the one or more speakers 108 while a voice communication session is also active via the one or more microphones 110 and the one or more speakers 108. The streamed audio may comprise audio content that is received from one or more external sources 120 and/or locally stored in the streamed audio module 104. The locally stored audio content such as music content may be played via, for example, video/audio playback operations and/or MP3 playback operations. Depending on different applications, an echo associated with the streamed audio may not be perceived as an echo to a far-end party. For example, an Internet radio may not be perceived as an echo and it may not necessarily be removed on a send path. An Internet radio may comprise audio content that is generated from an Internet radio source. In such instances, a background audio may be generated by the echo processing module 112 in the send path that is used for communicating the voice communication session using known information associated with the streamed audio during the echo cancellation operation.

In an exemplary embodiment of the invention, the echo associated with the streamed audio may not be eliminated or cancelled by the echo processing module 112 and a residual echo suppression may be operational or active during the echo cancellation operation. In this regard, only the echo associated with the far-end voice may be eliminated or cancelled by the echo processing module 112. In such instances, the known information associated with the streamed audio may comprise, for example, an echo replica corresponding to an echo associated with the streamed audio. The echo replica corresponding to the echo associated with the streamed audio may be generated via one or more filters in the echo processing module 112 during the echo cancellation operation. In this regard, the echo processing module 112 may be operable to suppress a residual echo associated with the far-end voice based on an energy or signal level of the echo replica corresponding to the echo associated with the streamed audio. The background audio may be generated by the echo processing module 112 using the echo replica corresponding to the echo associated with the streamed audio.

In another exemplary embodiment of the invention, a mixed echo associated with the far-end voice and the streamed audio may be eliminated or cancelled by the echo processing module 112. In such instances, regardless of the operation of the residual echo suppression during the echo cancellation operation, the known information associated with the streamed audio may comprise, for example, a modified version of the streamed audio. The modified version of the streamed audio may be generated by the echo processing module 112 via energy-level scaling and/or frequency equalization, for example. For the case of energy-level scaling, the modified version of the streamed audio may be generated via, for example, attenuating the energy level of the streamed audio by, for example, 30 dB. For the case of frequency equalization or spectrum shaping, the modified version of the streamed audio may be generated via, for example, attenuating some frequencies of the streamed audio more than others.

In this regard, the echo processing module 112 may be operable to generate the background audio using the modified version of the streamed audio. In instances when the residual echo suppression is operational or active during the echo cancellation operation, the echo processing module 112 may also be operable to suppress a residual echo associated with, for example, the far-end voice based on an energy or signal level of the modified version of the streamed audio.

Additional exemplary details of the operations of the echo processing module 112 may be described below with respect to FIG. 2.

Figure 2:
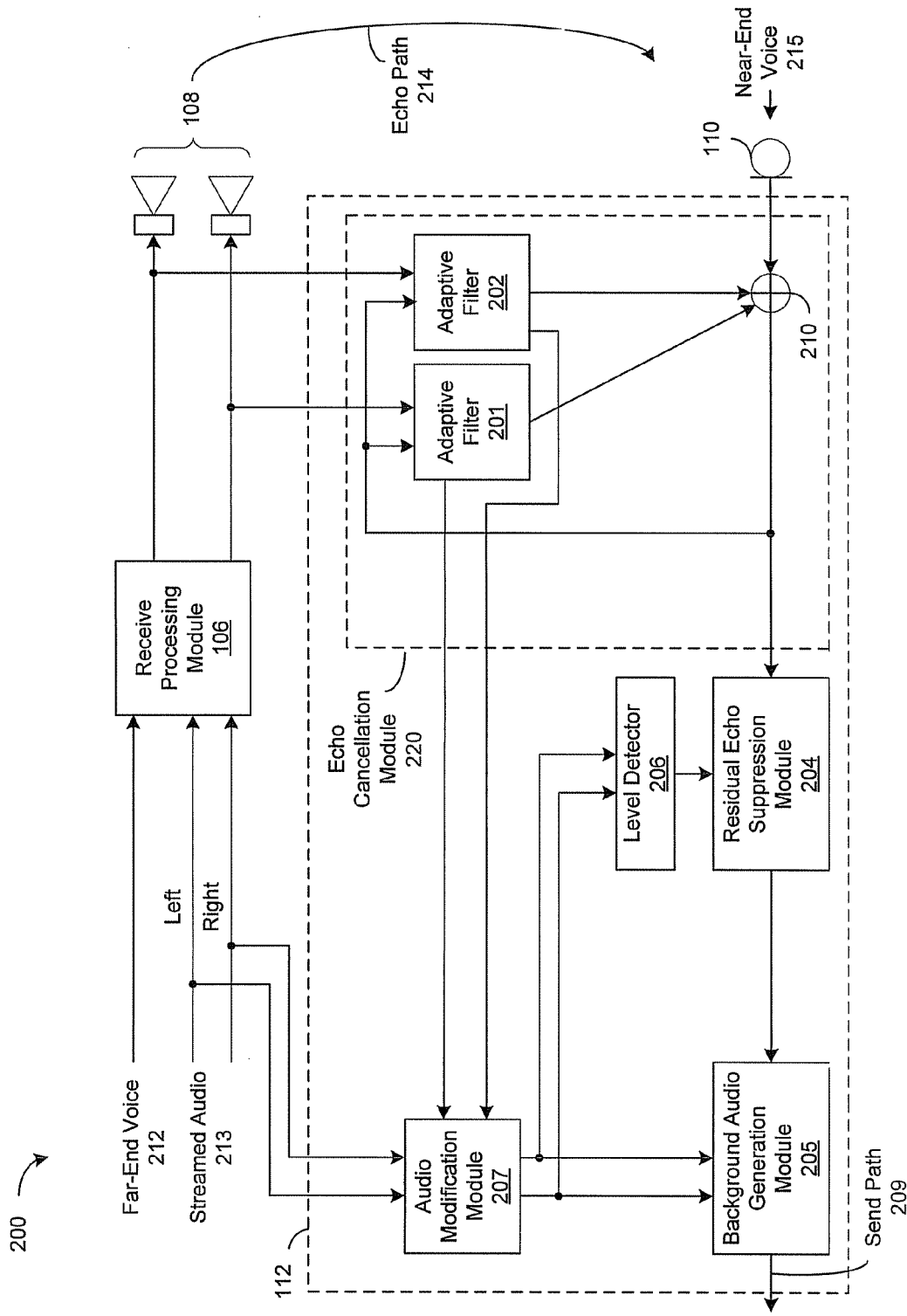
FIG. 2 is a block diagram illustrating an exemplary echo processing system in presence of streamed audio, in accordance with an embodiment of the invention.

FIG. 2 is a block diagram illustrating an exemplary echo processing system in presence of streamed audio, in accordance with an embodiment of the invention. Referring to FIG. 2, there is shown an echo processing system 200. The echo processing system 200 may comprise a receive processing module 106, two speakers 108, a microphone 110 and an echo processing module 112. The receive processing module 106, the speakers 108, the microphone 110 and the echo processing module 112 are described above with respect to FIG. 1. The echo processing module 112 may comprise an echo cancellation module 220, a residual echo suppression module 204, a level detector 206, an audio modification module 207 and a background audio generation module 205.

The echo cancellation module 220 may comprise adaptive filters 201-202, and a summer 210. The filters 201-202 may receive reference signals from the speakers 108.

Each of the adaptive filters 201-202 may comprise suitable logic, circuitry, interfaces and/or code that may be operable to generate echo replica via repeated adaptation process. The summer 210 may be operable to receive echo signals from the microphone 110 and receive output signals of the filters 201-202. The echo signals may comprise an echo associated with the far-end voice 212 and/or an echo associated with the streamed audio 213. The echo signals may be received by the microphone 110 along with a near-end voice 215. The summer 210 may generate output signals to inputs of the filters 201-202 for the repeated adaptation process. The summer 210 may be operable to subtract the echo replicas generated by the adaptive filters 201-202 from the echo signals so as to eliminate or cancel the echo signals.

In the exemplary embodiment of the invention illustrated in FIG. 2, two adaptive filters 201-202 are shown in the echo cancellation module 220. Notwithstanding, the invention may not be so limited. Accordingly, the filters 201-202 may be combined into one filter without departing from the spirit and scope of various embodiments of the invention.

The audio modification module 207 may comprise suitable logic, circuitry, interfaces and/or code that may be operable to generate output signals to the background audio generation module 205 and/or the level detector 206. For example, a generated output signal may comprise the echo replica corresponding to the echo associated with the streamed audio 213. The echo replica corresponding to the echo associated with the streamed audio 213 may be received by the audio modification module 207 from the filters 201-202 in the echo cancellation module 220. A generated output signal may comprise a modified version of the streamed audio 213, for example. The modified version of the streamed audio 213 may be generated by the audio modification module 207 via energy-level scaling and/or frequency equalization, for example. For the case of energy-level scaling, the modified version of the streamed audio 213 may be generated via, for example, attenuating the energy level of the streamed audio 213 by, for example, 30 dB. In some instances, the energy level of the streamed audio 213 may be attenuating to, for example, zero energy level so as to provide no signal to the background generation module 205 for background music generation or insertion. For the case of frequency equalization or spectrum shaping, the modified version of the streamed audio 213 may be generated via, for example, attenuating some frequencies of the streamed audio 213 more than others. The output signals of the audio modification module 207 may be used to generate a background audio in a send path 209 in the background audio generation module 205. In some instances, the audio modification module 207 may comprise a bulk delay function so as to assure correct timing alignment for the background audio generation. The generated background audio may be sent out along with a near-end voice 215 to a far-end party in the send path 209.

The level detector 206 may comprise suitable logic, circuitry, interfaces and/or code that may be operable to detect and/or calculate an energy or signal level of an output signal of the audio modification module 207. An output signal of the audio modification module 207 may comprise an echo replica corresponding to the echo associated with the streamed audio 213 or a modified version of the streamed audio 213, for example. The detected energy or signal level information may be used by the residual echo suppression module 204 for calculating an echo masking effort or level associated with the output signal of the audio modification module 207. The calculated echo masking effort may be used by the residual echo suppression module 204 to determine an effort of a residual echo suppression.

The residual echo suppression module 204 may comprise suitable logic, circuitry, interfaces and/or code that may be operable to eliminate or suppress residual echoes, such as, for example, a residual echo associated with the far-end voice 212. The residual echo is an echo that is not eliminated or cancelled by the echo cancellation module 220. This may occur as a result of a deficient length of the adaptive filter 201 or 202 and/or as a result of a mismatch between a true and an estimated echo path 214. The residual echo suppression module 204 may employ a non-linear processor (NLP) function, for example, for residual echo suppression. However, since the streamed audio 213 tends to be continuous, whenever a near-end voice 215 is active, it is essentially a doubletalk condition. To completely or substantially remove a resulting residual echo associated with the streamed audio 213, the NLP may have to be relatively aggressive. In this regard, an output signal of the audio modification module 207 such as, for example, a modified version of the streamed audio 213 may be used to generate the background audio in the background audio generation module 205 so as to mask the residual echo associated with the streamed audio 213. In such an instance, the NLP may be configured to primarily remove the residual echo associated with the far-end voice 212, for example.

The residual echo suppression module 204 may use the energy or signal level information of the output signal of the audio modification module 207 for calculating an echo masking effort or level associated with the output signal of the audio modification module 207. The calculated echo masking effort may be used by the residual echo suppression module 204 to determine an effort of a residual echo suppression. For example, based on the echo masking calculations, an echo masking effort of the output signal of the audio modification module 207 may result in less aggressive suppression effort and fewer associated artifacts during the process of the residual echo suppression.

The background audio generation module 205 may comprise suitable logic, circuitry, interfaces and/or code that may be operable to generate a background audio in a send path 209 using the output signal of the audio modification module 207.

In this regard, the background audio may be generated via an addition or an insertion operation into the send path 209. The output signal of the audio modification module 207 may comprise, for example, an echo replica corresponding to an echo associated with the streamed audio 213 or a modified version of the streamed audio 213. In some instances, the background audio generation module 205 may also comprise a comfort noise generator. The comfort noise generator may generate artificial background noise as comfort noise so as to avoid a silent effect. In this regard, the background audio may comprise the output signal of the audio modification module 207 and/or the comfort noise. The generated background audio may be sent out along with the near-end voice 215 to a far-end party in the send path 209.

In operation, the echo cancellation module 220 may be operable to generate echo replicas using one or more filters 201-202 during an echo cancellation operation. In an exemplary embodiment of the invention, the echo cancellation module 220 may be operable to generate an echo replica corresponding to an echo associated with the streamed audio 213 and an echo replica corresponding to an echo associated with the far-end voice 212 using the one or more filters 201-202 during the echo cancellation operation. The echo associated with the far-end voice 212 may be eliminated or cancelled by the echo cancellation module 220 using the generated echo replica corresponding to the echo associated with the far-end voice 212, during the echo cancellation operation. The audio modification module 207 may be operable to generate an output signal which may comprise the echo replica corresponding to an echo associated with the streamed audio 213. The level detector 206 may be operable to detect an energy or signal level of the generated echo replica corresponding to the echo associated with the streamed audio 213. The detected energy or signal level information may be used by the residual echo suppression module 204 for calculating an echo masking effort or level associated with the generated echo replica corresponding to the echo associated with the streamed audio 213. The residual echo suppression module 204 may be operable to determine an effort of a residual echo suppression based on the calculated echo masking effort. A resulting residual echo associated with the far-end voice 212 may be eliminated or suppressed by the residual echo suppression module 204 based on the determination. For example, based on the echo masking calculations, the echo masking effort of the generated echo replica corresponding to the echo associated with the streamed audio 213 may result in less aggressive suppression effort and fewer associated artifacts during the process of the residual echo suppression.

In instances when the residual echo suppression module 204 is operational or active, a background audio may be generated by the background audio generation module 205 in the send path 209 using the echo replica corresponding to the echo associated with the streamed audio 213. In this regard, the background audio may be considered as a comfort noise so as to avoid the silent effect introduced by the residual echo suppression. The background audio along with the near-end voice 215 may be sent out in the send path 209 to the far-end party.

In an exemplary embodiment of the invention, the echo cancellation module 220 may be operable to generate an echo replica corresponding to a mixed echo associated with the streamed audio 213 and the far-end voice 212 using the one or more filters 201-202 during the echo cancellation operation. The mixed echo associated with the far-end voice 212 and the streamed audio 213 may be eliminated or cancelled by the echo cancellation module 220 using the generated echo replica corresponding to the mixed echo associated with the far-end voice 212 and the streamed audio 213, during the echo cancellation operation. The audio modification module 207 may be operable to generate an output signal which may comprise a modified version of the streamed audio 213. The modified version of the streamed audio 213 may be generated by the audio modification module 207 via energy-level scaling and/or frequency equalization, for example. The level detector 206 may be operable to detect an energy or signal level of the generated modified version of the streamed audio 213. The detected energy or signal level information may be used by the residual echo suppression module 204 for calculating an echo masking effort or level associated with the generated modified version of the streamed audio 213. The residual echo suppression module 204 may be operable to determine an effort of a residual echo suppression based on the calculated echo masking effort. A resulting residual echo such as, for example, the resulting residual echo associated with the far-end voice 212 may be eliminated or suppressed by the residual echo suppression module 204 based on the determination. For example, based on the echo masking calculations, the echo masking effort of the generated modified version of the stream audio 213 may result in less aggressive suppression effort and fewer associated artifacts during the process of the residual echo suppression.

Regardless of an operation or being active of the residual echo suppression module 204, a background audio may be generated by the background audio generation module 205 in the send path 209 using, for example, the generated modified version of the streamed audio 213. In this regard, the audio modification module 207 may comprise a bulk delay function so as to assure correct timing alignment for the background audio generation. The background audio along with the comfort noise and the near-end voice 215 may be sent out in the send path 209 to the far-end party.

In the exemplary embodiment of the invention illustrated in FIG. 2, two speakers 108, one microphone 110 and a far-end voice 212 are shown. Notwithstanding, the invention may not be so limited. The number of the speakers 108 and the number of the microphone 110 may be different. The far-end voice 212 may be multi-party voices in a conference, and the echo from any conferee may be cancelled and/or suppressed during the echo cancellation operation.

Figure 3:
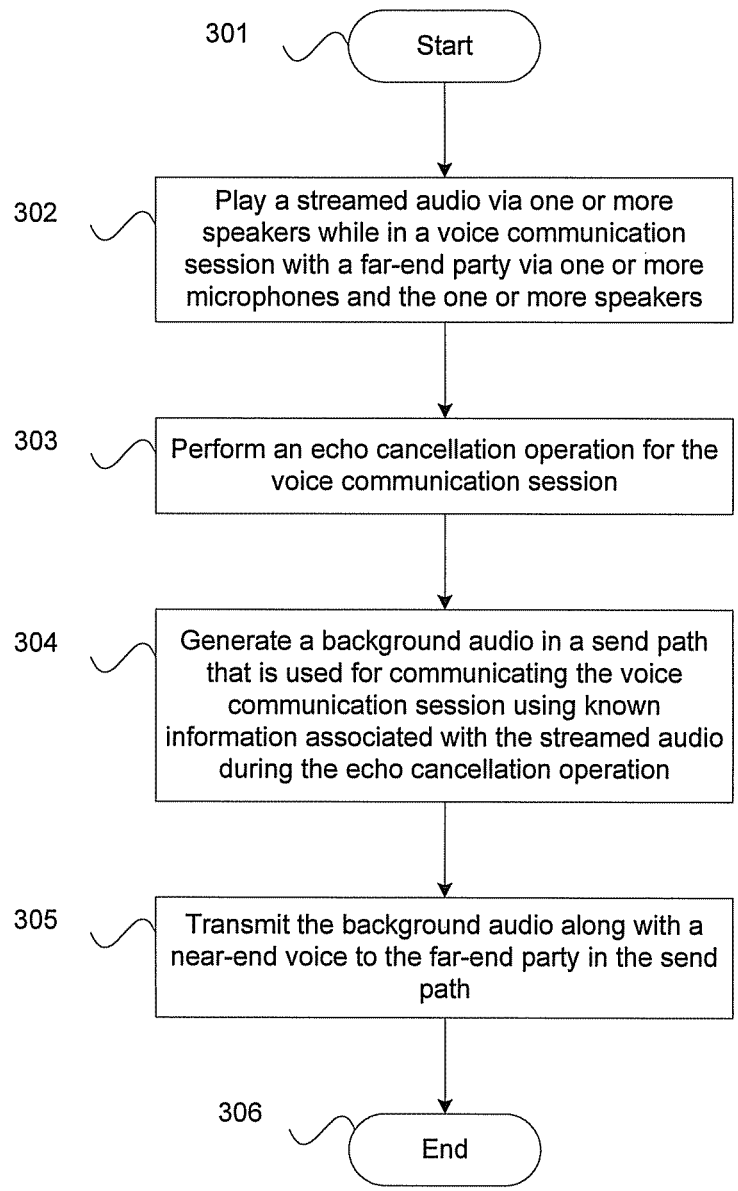
FIG. 3 is a flow chart illustrating exemplary steps for echo cancellation in presence of streamed audio, in accordance with an embodiment of the invention.

FIG. 3 is a flow chart illustrating exemplary steps for echo cancellation in presence of streamed audio, in accordance with an embodiment of the invention. Referring to FIG. 3, the exemplary steps start at step 301. In step 302, the streamed audio module 104 in the communication device 100 may be operable to play a streamed audio 213 via one or more speakers 108 while in a voice communication session with a far-end party via one or more microphones 110 and the one or more speakers 108. In step 303, the echo processing module 112 in the communication device 100 may be operable to perform an echo cancellation operation for the voice communication session. In step 304, a background audio may be generated in a send path 209 that is used for communicating the voice communication session, by the echo processing module 112, using the known information associated with the streamed audio 213 during the echo cancellation operation. In step 305, the background audio along with, for example, a near-end voice 215 may be transmitted by the communication device 100 to the far-end party in the send path 209. The exemplary steps may proceed to the end step 306.

Figure 4:
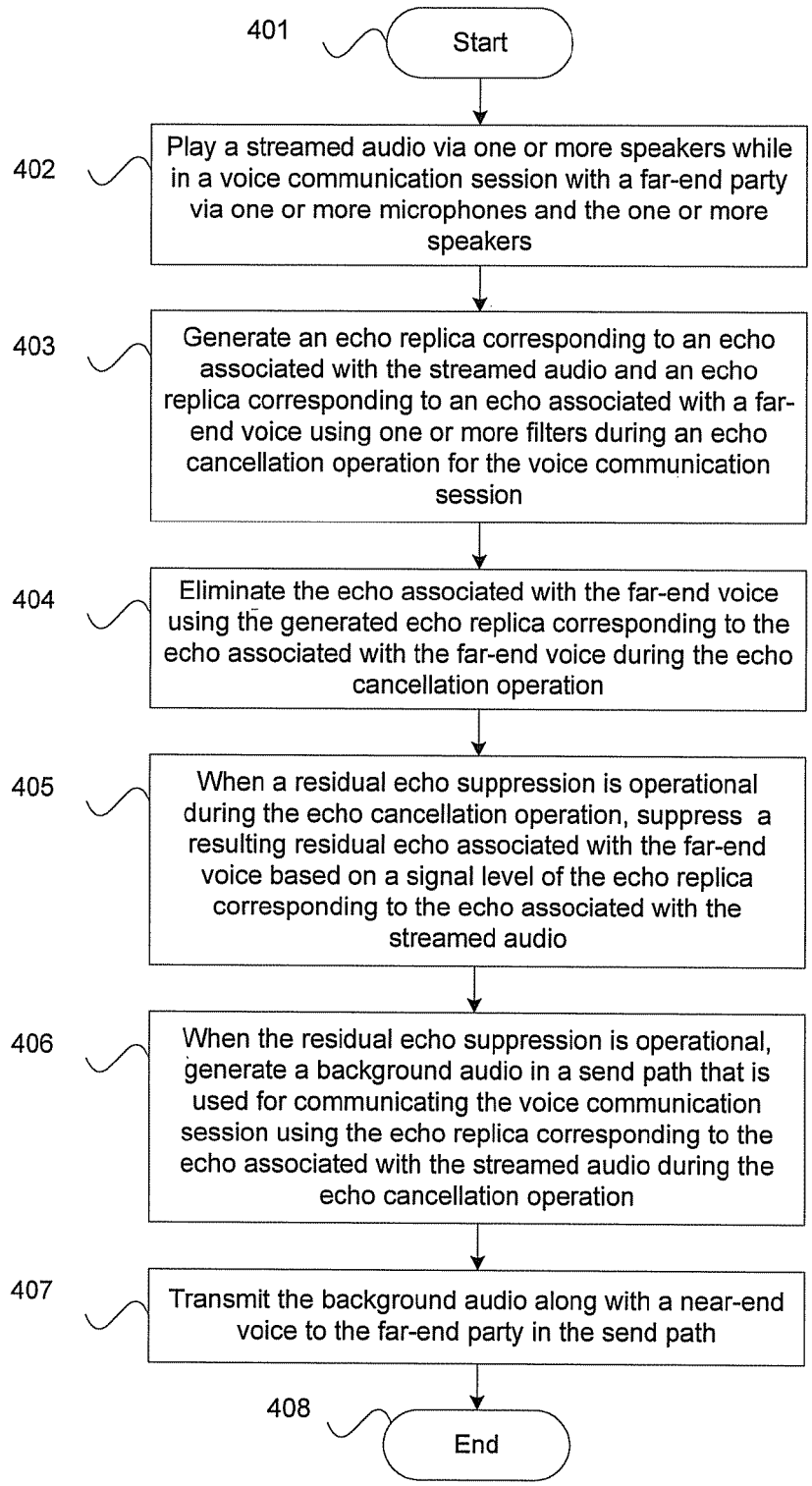
FIG. 4 is a flow chart illustrating exemplary steps for implementing an echo cancellation in presence of streamed audio, in accordance with an embodiment of the invention.

FIG. 4 is a flow chart illustrating exemplary steps for implementing an echo cancellation in presence of streamed audio, in accordance with an embodiment of the invention. Referring to FIG. 4, the exemplary steps start at step 401. In step 402, the streamed audio module 104 in the communication device 100 may be operable to play a streamed audio 213 via one or more speakers 108 while in a voice communication session with a far-end party via one or more microphones 110 and the one or more speakers 108. In step 403, the echo cancellation module 220 in the echo processing module 112 of the communication device 100 may be operable to generate an echo replica corresponding to an echo associated with the streamed audio 213 and an echo replica corresponding to an echo associated with a far-end voice 212 using one or more filters 201-202 during an echo cancellation operation for the voice communication session. In step 404, the summer 210 in the echo cancellation module 220 may be operable to eliminate or cancel the echo associated with the far-end voice 212 using the generated echo replica corresponding to the echo associated with the far-end voice 212 during the echo cancellation operation.

In step 405, in instances when a residual echo suppression is operational or active during the echo cancellation operation, the residual echo suppression module 204 in the echo processing module 112 may be operable to suppress a resulting residual echo associated with the far-end voice 212 based on a signal level of the echo replica corresponding to the echo associated with the streamed audio 213. In step 406, in instances when the residual echo suppression is operational or active, the background audio generation module 205 in the echo processing module 112 may be operable to generate a background audio in a send path 209 that is used for communicating the voice communication session, using the echo replica corresponding to the echo associated with the streamed audio 213 during the echo cancellation operation. In step 407, the background audio along with, for example, a near-end voice 215 may be transmitted by the communication device 100 to the far-end party in the send path 209. The exemplary steps may proceed to the end step 408.

Figure 5:
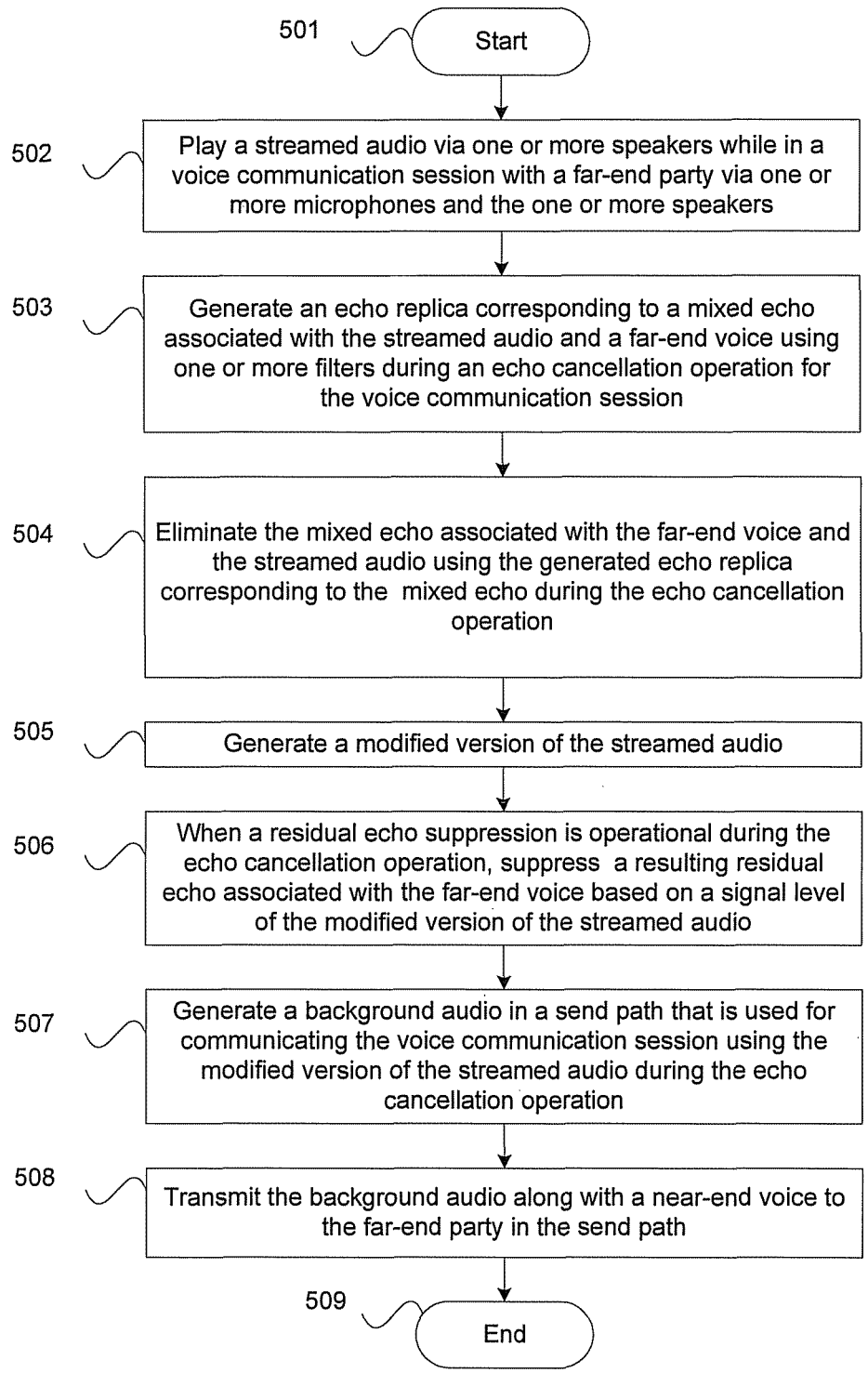
FIG. 5 is a flow chart illustrating exemplary steps for implementing an echo cancellation in presence of streamed audio, in accordance with an embodiment of the invention.

FIG. 5 is a flow chart illustrating exemplary steps for implementing an echo cancellation in presence of streamed audio, in accordance with an embodiment of the invention. Referring to FIG. 5, the exemplary steps start at step 501. In step 502, the streamed audio module 104 in the communication device 100 may be operable to play a streamed audio 213 via one or more speakers 108 while in a voice communication session with a far-end party via one or more microphones 110 and the one or more speakers 108. In step 503, the echo cancellation module 220 in the echo processing module 112 of the communication device 100 may be operable to generate an echo replica corresponding to a mixed echo associated with the streamed audio 213 and a far-end voice 212 using one or more filters 201-202 during an echo cancellation operation for the voice communication session. In step 504, the summer 210 in the echo cancellation module 220 may be operable to eliminate or cancel the mixed echo associated with the far-end voice 212 and the streamed audio 213 using the generated echo replica corresponding to the mixed echo during the echo cancellation operation.

In step 505, the audio modification module 207 in the echo processing module 112 may be operable to generate a modified version of the streamed audio 213. The modified version of the streamed audio 213 may be generated via, for example, energy-level scaling and/or frequency equalization. In step 506, in instances when a residual echo suppression is operational or active during the echo cancellation operation, the residual echo suppression module 204 in the echo processing module 112 may be operable to suppress a resulting residual echo associated with, for example, the far-end voice 212 based on a signal level of the modified version of the streamed audio 213. In step 507, the background audio generation module 205 in the echo processing module 112 may be operable to generate a background audio in a send path 209 that is used for communicating the voice communication session, using, for example, the modified versions of the streamed audio 213 during the echo cancellation operation. In this regard, the audio modification module 207 may comprise a bulk delay function so as to assure correct timing alignment for the background audio generation. In step 508, the background audio along with, for example, a near-end voice 215 may be transmitted by the communication device 100 to the far-end party in the send path 209. The exemplary steps may proceed to the end step 509.

In various embodiments of the invention, a communication device 100 may comprise one or more speakers 108 and one or more microphones 110. A streamed audio module 104 in the communication device 100 may be operable to play a streamed audio 213 via the one or more speakers 108 while the communication device 100 is engaged in a voice communication session via the one or more microphones 110 and the one or more speakers 108. During an echo cancellation operation for the voice communication session, a background audio may be generated by the echo processing module 112 in a send path 209 that is used for communicating the voice session, using known information associated with the streamed audio 213. In this regard, the streamed audio 213 may comprise audio content that is received from one or more external sources 120 and/or locally generated by the streamed audio module 104 in the communication device 100.

In an exemplary embodiment of the invention, an echo cancellation module 220 in the echo processing module 112 may be operable to generate an echo replica corresponding to an echo associated with the streamed audio 213 and an echo replica corresponding to an echo associated with a far-end voice 212 using one or more filters 201-202 during the echo cancellation operation. The echo associated with the far-end voice 212 may be eliminated by a summer 210 in the echo cancellation module 220 using the generated echo replica corresponding to the echo associated with the far-end voice 212 during the echo cancellation operation. In instances when a residual echo suppression is operational or active during the echo cancellation operation, a residual echo suppression module 204 in the echo processing module 112 may be operable to suppress a resulting residual echo associated with the far-end voice 212 based on a signal level of the echo replica corresponding to the echo associated with the streamed audio 213. In this regard, the background audio in the send path 209 may be generated by a background audio generation module 205 in the echo processing module 112 using the echo replica corresponding to the echo associated with the streamed audio 213.

In an exemplary embodiment of the invention, the echo cancellation module 220 in the echo processing module 112 may be operable to generate an echo replica corresponding to a mixed echo associated with the streamed audio 213 and a far-end voice 212 using one or more filters 201-202 during the echo cancellation operation. The summer 210 in the echo cancellation module 220 may be operable to eliminate the mixed echo associated with the far-end voice 212 and the streamed audio 213 using the generated echo replica corresponding to the mixed echo during the echo cancellation operation. A modified version of the streamed audio 213 may be generated by an audio modification module 207 in the echo processing module 112. The modified version of the streamed audio 213 may be generated by the audio modification module 207 via, for example, energy-level scaling and/or frequency equalization. In instances when a residual echo suppression is operational or active during the echo cancellation operation, the residual echo suppression module 204 may be operable to suppress a resulting residual echo associated with, for example, the far-end voice 212 based on a signal level of the modified version of the streamed audio 213. In this regard, the background audio in the send path 209 may be generated by the background audio generation module 205 using the modified version of the streamed audio 213, regardless of an operation of the residual echo suppression module 204. The audio modification module 207 may comprise a bulk delay function so as to assure correct timing alignment for the background audio generation.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for echo cancellation in presence of streamed audio.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
in a communication device comprising one or more speakers and one or more microphones:
receiving a streamed audio and a far-end voice;
combining said streamed audio and said far-end voice to generate a speaker output signal;
generating an echo replica of said speaker output signal;
playing said speaker output signal via said one or more speakers while said communication device is engaged in a voice communication session via said one or more microphones and said one or more speakers;
determining an energy level of said echo replica;
performing a residual echo suppression on said far-end voice of said voice communication session according to said energy level to generate a residual echo suppressed signal;
attenuating said streamed audio to generate a modified streamed audio;
generating a background audio in a send path that is used for communicating said voice communication session, said generating comprising inserting said modified streamed audio in said send path during an echo cancellation operation performing a residual echo suppression on a far-end voice of said voice communication session; and
determining a level of said residual echo suppression based on said echo replica associated with said streamed audio.

2. The method according to claim 1, wherein said streamed audio comprises audio content that is received from one or more external sources.

3. The method according to claim 1, wherein said streamed audio comprises audio content that is locally generated within said communication device.

4. The method according to claim 1, comprising:
generating said echo replica of said speaker output signal using one or more filters during said echo cancellation operation; and
reducing an echo associated with said far-end voice using said generated echo replica during said echo cancellation operation.

5. The method according to claim 1, comprising, when said residual echo suppression is operational during said echo cancellation operation, determining said energy level of said echo replica based on said modified streamed audio.

6. The method according to claim 1, wherein attenuating said streamed audio to generate said modified streamed audio comprises performing frequency equalization.

7. A system for processing signals, the system comprising:
one or more processors, one or more circuits, or any combination thereof for use in a communication device, said communication device comprising one or more speakers and one or more microphones, wherein said one or more processors, one or more circuits, or any combination thereof are operable to:
during playing of a streamed audio via said one or more speakers while said communication device is engaged in a voice communication session via said one or more microphones and said one or more speakers, generate a background audio in a send path that is used for communicating said voice communication session using an echo replica associated with said streamed audio during an echo cancellation operation for said voice communication session;
perform a residual echo suppression on a far-end voice of said voice communication session;
determine an amount of effort of said residual echo suppression based on said echo replica associated with said streamed audio; and
generate said background audio in said send path by inserting said streamed audio in the send path.

8. The system according to claim 7, wherein said streamed audio comprises audio content that is received from one or more external sources.

9. The system according to claim 7, wherein said streamed audio comprises audio content that is locally generated within said communication device.

10. The system according to claim 7, wherein said one or more processors, one or more circuits, or any combination thereof are operable to:
- generate said echo replica associated with said streamed audio and an echo replica corresponding to an echo associated with said far-end voice using one or more filters during said echo cancellation operation; and
- eliminate said echo associated with said far-end voice using said generated echo replica corresponding to said echo associated with said far-end voice during said echo cancellation operation.

11. The system according to claim 7, wherein said one or more processors, one or more circuits, or any combination thereof are operable to:
- generate an echo replica corresponding to a mixed echo associated with said streamed audio and said far-end voice using one or more filters during said echo cancellation operation; and
- eliminate said mixed echo associated with said far-end voice and said streamed audio using said generated echo replica corresponding to said mixed echo during said echo cancellation operation.

12. The system according to claim 11, wherein said one or more processors, one or more circuits, or any combination thereof that are operable to generate said background audio in said send path by inserting said streamed audio in the send path further comprise one or more processors, one or more circuits, or any combination thereof are operable to modify said streamed audio by attenuating said streamed audio.

13. The system according to claim 12, wherein, when said residual echo suppression is operational during said echo cancellation operation, wherein said one or more processors, one or more circuits, or any combination thereof are operable to determine said amount of effort of said residual echo suppression based on a signal level of said streamed audio.

14. The system according to claim 12, wherein said one or more processors, one or more circuits, or any combination thereof are operable to modify said streamed audio by performing at least one of energy level scaling or frequency equalization on said streamed audio.

15. A method for processing signals, the method comprising:
- receiving a near-end voice via a microphone, the near end voice being configured to be transmitted to a remote device via a send path;
- receiving a far-end voice, the far-end voice being configured to be played by at least one speaker;
- receiving a streamed audio, the streamed audio being configured to be played by the at least one speaker;
- generating an echo replica based on the far-end voice and the streamed audio;
- generating an echo canceled signal based on the near-end voice and the echo replica; and
- inserting the streamed audio into the send path to transmit the streamed audio to the remote device.

16. The method according to claim 15, further comprising generating the streamed audio locally.

17. The method according to claim 15, further comprising:
- performing at least one of an energy level scaling or a frequency equalization to modify the streamed audio.

18. The method according to claim 17, further comprising performing a bulk delay operation to assure a correct timing alignment of the streamed audio in the send path.

19. The method according to claim 15, further comprising performing a residual echo suppression on the echo canceled signal by determining an echo masking level of the residual echo suppression based on a signal level of the echo replica.

* * * * *